United States Patent [19]

Sakakibara et al.

[11] 3,862,438

[45] Jan. 21, 1975

[54] VOLTAGE MEMORY CIRCUIT FOR ELECTRICAL CONTROL SYSTEMS

[75] Inventors: Naoji Sakakibara, Takara-machi; Takeshi Nakane, Okazaki, both of Japan

[73] Assignee: Aisin Seiki Kabushiki Kaisha, Kariya-shi, Aichi-ken, Japan

[22] Filed: Mar. 2, 1973

[21] Appl. No.: 337,587

[30] Foreign Application Priority Data

Mar. 8, 1972 Japan .............................. 47-23857

[52] U.S. Cl. ............ 307/238, 123/139 E, 307/235, 318/139

[51] Int. Cl. ........................ H03k 5/20, G11c 27/00

[58] Field of Search ............ 307/235, 238; 123/102, 123/139 E; 318/139

[56] References Cited

UNITED STATES PATENTS

| | | | |
|---|---|---|---|
| 3,485,316 | 12/1969 | Slavin et al. | 123/102 X |
| 3,527,961 | 9/1970 | Palini | 307/235 |
| 3,648,798 | 3/1972 | Jania | 123/102 X |

*Primary Examiner*—John Zazworsky
*Attorney, Agent, or Firm*—Moonray Kojima

[57] ABSTRACT

A voltage memory circuit wherein a memory condenser may be used to memorize an instantaneous voltage generated from a voltage generator, but the reading out of a reference voltage memorized in the condenser is intermittently made by way of a source follower circuit including a junction-gate field-effect transistor in a certain cycle and the reference voltage is memorized in a second memory condenser.

11 Claims, 3 Drawing Figures

VOLTAGE MEMORY CIRCUIT FOR ELECTRICAL CONTROL SYSTEMS

BACKGROUND OF THE INVENTION

The present invention relates to a voltage memory circuit for electronic control systems and more particularly to an improvement of a voltage memory circuit adapted, for instance, to an electronic speed control system for a vehicle.

MOS type field-effect transistors have been used for a conventional electronic speed control system for a vehicle to reading out a reference voltage memorized in a memory condenser in a corresponding amount with a selected vehicle speed. The choice of the MOS type field-effect transistor has been made because of its high insulating characteristics represented by its input impedance of $10^{13}$ ohms. Generally, a utilizable memory condenser of a high insulating impedance, for instance, a film condenser, may be featured to approximately be 1 microfarad. The time constant $T$ (sec) of the 1 microfarad condenser and the $10^{13}$ ohm MOS type field-effect transistor is represented by a formula, $$T = 1 \times 10^{-6} \times 10^{13} = 10^7 = 2{,}800 \text{ (hours)}$$

This figure may be more than enough for memory hours.

On the other hand, the MOS type field-effect transistor has a drawback that the gate of the transistor can easily be destroyed by a small amount of electrostatic energy due to the high input impedance thereof. This causes difficulties in handling the MOS type field-effect transistor and increases the production cost.

SUMMARY OF THE INVENTION

The prime object of the present invention is, therefore, to provide a voltage memory circuit for an electronic control system, wherein a junction-gate field-effect transistor replaces a MOS type field-effect transistor thereby to ease handling to a great extent and to reduce considerably the production cost.

Another important object of the present invention is to provide a voltage memory circuit for an electronic control system, having the above-mentioned characteristics, wherein the circuit is designed and constructed, preferably, for adaptation of an electronic speed control system for a vehicle.

Another important object of the present invention is to provide a voltage memory circuit for an electronic control system, having the above-mentioned characteristics, wherein a voltage proportional to a selected vehicle speed is memorized in a memory condenser and read out therefrom intermittently by a junction-gate field-effect transistor in a cycle so that the read-out voltage is compared against a voltage generated by a voltage generating circuit in proportion with an instantaneous vehicle speed.

BRIEF DESCRIPTION OF THE DRAWINGS

Additional objects and advantages of the present invention will be more readily apparent from the following detailed description of embodiments thereof when taken together with the accompanying drawing in which.

DESCRIPTION OF THE PREFERRED EMBODIMENTS

A preferred embodiment described hereinafter is an example that a voltage memory circuit in accordance with the present invention is adapted for an automatic vehicle speed control system.

Figure 1:
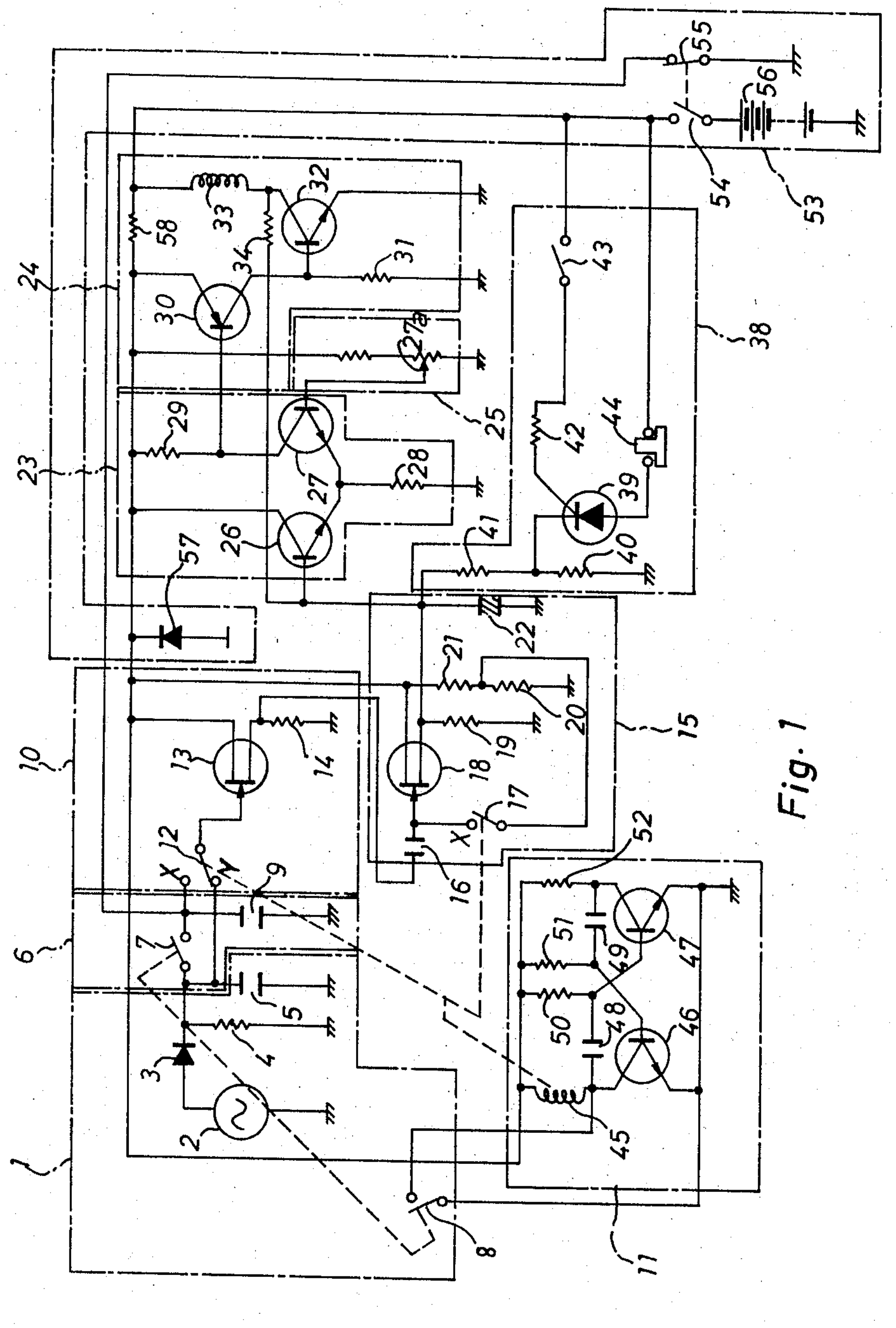
FIG. 1 depicts diagramatically a circuit for an electronic speed control system for a vehicle, the circuit including therein a voltage memory circuit in accordance with the present invention.

Referring now to FIG. 1 of the drawings, there is shown a voltage generating circuit 1 for generating a voltage proportional to a vehicle speed. The circuit 1 comprises a vehicle prime alternator 2 for generating a voltage proportional to a vehicle speed, a rectifying diode 3, a load resistor 4 and a smoothing condenser 5.

A vehicle speed memory circuit 6 substantially comprises a normally open switch 7 of a push-button type which is a set switch to be closed on a vehicle speed setting and interlocked with a switch 8. Reference numeral 9 represents a main speed memory formed by such a high insulating impedance condenser as a film condenser whose capacity is predetermined in accordance with a necessary memory period. This memory condenser 9 is connected to the output of the voltage generating circuit 1 through the switch 7. A vehicle speed read-out circuit 10 comprises a relay contact 12 operated by an intermittent pulse generating circuit 11 and a first source follower circuit including a junction-gate field-effect transistor 13 and a source resistor 14. The intermittent pulse generating circuit 11 comprises a relay coil 45 to activate the contacts 12 and 17, and an astable multivibrator formed by transistors 46, 47, condensers 48, 49, resistors 50, 51 and a load resistor 52.

A comparison circuit 15 comprises a subsidiary speed memory formed by a condenser 16, a relay contact 17 operated by the intermittent pulse generating circuit 11, a second source follower circuit including a junction-gate field-effect transistor 18 and a source resistor 19, voltage dividing resistors 20, 21 and a condenser 22 in parallel with the source resistor 19.

A differential amplifier 23 is for amplifying stably signals generated from the comparison circuit 15 so as to activate a vacuum valve control circuit 24. This differential amplifier 23 comprises transistors 26 and 27 having a common emitter resistor 28 and a load resistor 29 connected to the collector of the transistor 27. The base of the transistor 27 is connected to an input terminal *27a* of a throttle position feedback circuit 25. The said vacuum valve control circuit 24 includes a transistor 30, a load resistor 31 for the transistor 30, a transistor 32, a valve coil 33 which is a load to the transistor 32 and a feedback resistor 34. This circuit 24 regulates a vacuum valve 137 of a servomotor 136 (described hereinafter) by means of output from the differential amplifier 23. The throttle position feedback circuit 25 includes the movable terminal *27a* with the base of the transistor 27 to control voltage to be applied to the base of the transistor 27 so that the operation of the differential amplifier may be compensated. In this feedback circuit 25, resistance is in inverted proportion with vehicle speed, thereby prevented in hunting caused by excessive increases and decreases in actual vehicle speeds in respect with the memorized vehicle speed.

A safety circuit 38 is disclosed under the circuits 23 and 24 in the figure and represents a release circuit to disable function of the speed control system when a braking application is made while the vehicle is traveling. This release circuit 38 comprises a silicon controlled rectifier 39, a load resistor 40 for the silicon controlled rectifier 39, a resistor 41 to apply positive potential on the differential amplifier 23, a resistor 42 to protect the gate of the silicon controlled rectifier 39, a normally open brake switch 43 to be closed when the brake pedal of the vehicle is actuated and a normally closed resume switch 44 to be used to resume the once preset vehicle speed.

An electric source circuit 53 comprises an open-type switch 54 or ignition key switch of the vehicle, a closed-type switch 55 interlocked with the open-type switch 54, a vehicle battery 56, a constant voltage diode 57, and a resistor 58.

The vacuum servomotor 136 described above comprises a housing 145 of which the interior is divided by a plate 146 including a communication hole 159 therethrough and a cover member 169 mounted on the housing 145 by fastening screws 170, the cover member 169 being provided with a vent hole 181 therethrough. A diaphragm 35 is held by the housing 145 and the cover member 169 to form a servo chamber 172 with the housing 145. The diaphragm 35 is also held by a retainer plate 173 and a pressure plate 174. The diaphragm 35, the plate 173 and the pressure plate 174 are fastened together by a rivet 175 which is connected to an engine throttle lever 178 for controlling the engine throttle 36 by such a conventional device 177 as a wire, a link or the like. The engine throttle lever 178 is operably connected to a brake foot pedal 180. A coil spring 176 is interposed between the plate 146 and the pressure plate 174 so as to normally bias the diaphragm 35 leftwardly in the figure.

The housing 145 is provided with an atmospheric nozzle 37 thereon which is covered by an air cleaner 154 including a cover member 160 which is fastened on the housing 145 by a screws **160*a*. The cover member 160 is provided with a vent hole 161 therethrough. A vacuum pipe 148 is inserted sealingly in a vacuum pipe receiver 148*a* provided on the housing 145. The vacuum pipe 148 includes therein an orifice 149 to form a vacuum nozzle 152 at one end thereof jutting inside the housing 145 and a conduit 103 is sealingly connected with the other end of the vacuum pipe 148. The conduit 103 is at its other end in connection with an engine manifold 102**.

Mounted securedly on the plate 146 by a fastening screw 147 is a vacuum valve device 137 comprising an L-shape retainer 156 of which the perpendicular portion is directly mounted on the plate 146, and a valve coil 33 mounted on the spring retainer 156 and including an armature 157 therein. The valve device 137 further comprises a reverse L-shaped valve member 150 having thereon a pair of sealing rubber **151*a* and 151*b* respectively positioned to face the vacuum nozzle 152 and the atmospheric nozzle 37, the valve plate 150 being swingably journalled on the top end of the horizontal portion of the retainer 156, and a return spring 155 interposed between the valve member 150 and a hook 156*a* provided on the horizontal portion of the retainer 156**.

A pair of electric terminals 162 are air-tightly mounted on the housing 145, each of the terminals 162 comprising a washer 163, a terminal plate 164, and an insulator 165. The said terminal components are integrally mounted air-tightly on the housing 145 by a fastening nut 166. The terminal plate 164 is connected with a lead wire 167 which is connected to the valve coil 33.

Figure 3:
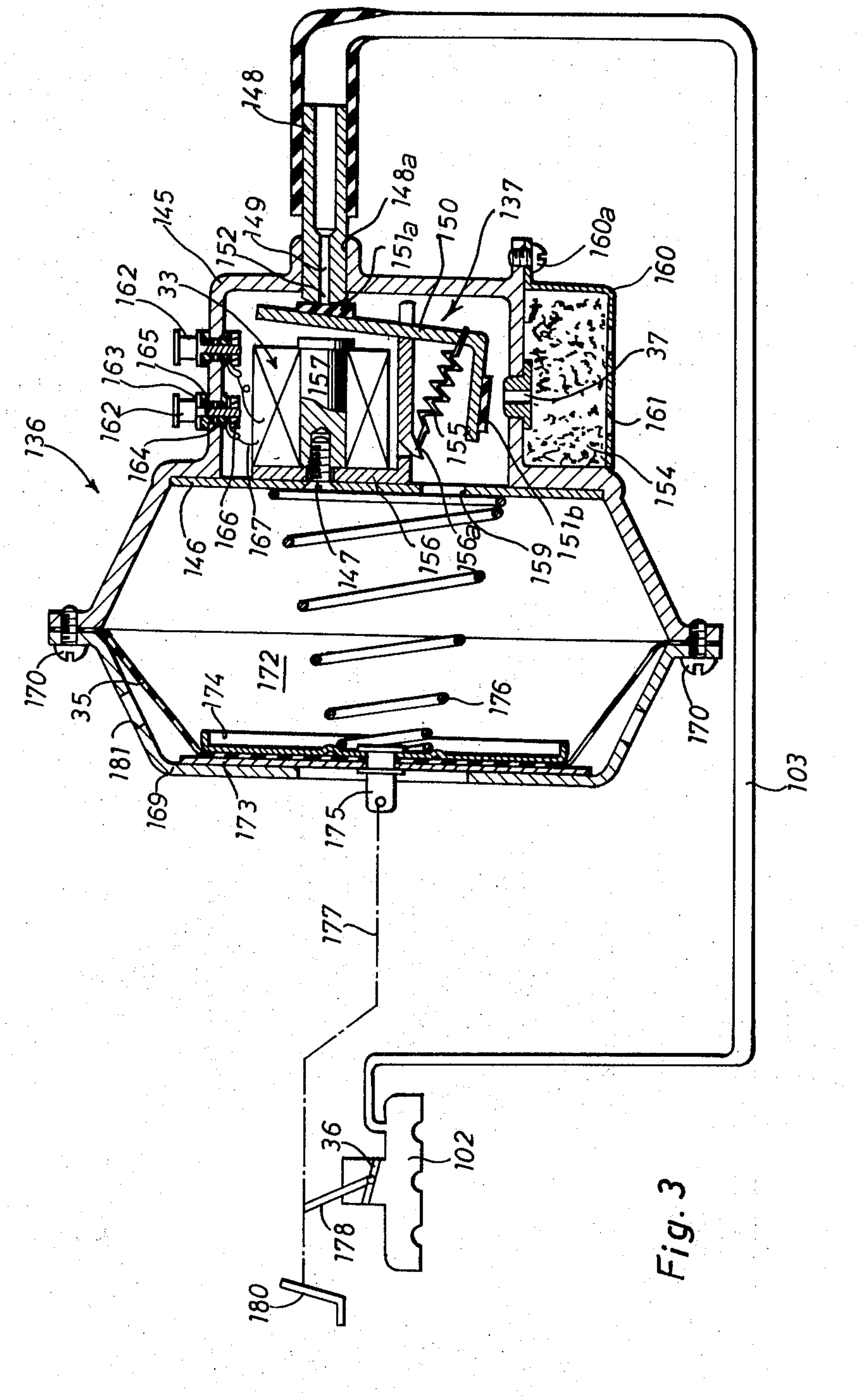
FIG. 3 is a view of an elevational cross-section of a vacuum servomotor to be controlled by the electronic speed control system shown in FIG. 1 or 2.

Operation of the vacuum servo motor having the above mentioned construction is related hereinafter. While the valve coil 33 is conditioned to a non-conducting state, the valve member 150 stays in the position as shown in FIG. 3, wherein the vacuum nozzle 152 is closed and the atmospheric nozzle 37 is open.

Application of electric current to the terminals 162 energizes the valve coil 33, thereby activating the armature 157. The activated armature 157 attracts the valve member 150 against the resilient force of the return spring 155. Thus, the vacuum nozzle 152 is open and the atmospheric nozzle 37 is closed. Under this state, engine vacuum is supplied into the servo chamber 172 from the engine manifold 102 through the conduit 103, the vacuum pipe 148, and the hole 159 of the plate 146. Simultaneously, the diaphragm 35 is moved rightward in the figure against the resilient force of the spring 176 by the atmospheric pressure acting on the left face thereof, so that the engine throttle lever 178 is operated to regulate the engine throttle 36.

When the coil 33 is de-energized, the armature 157 loses its attracting force and the valve member 150 returns to its original position by the resilient force of the return spring 155. This closes the vacuum nozzle 152 and opens the atmospheric nozzle 37 to consequentially changeover the pressure within the servo chamber 172 from vacuum to atmosphere. Then, the spring 176 is effected and the diaphragm 35 is biased to its original position as shown in FIG. 3.

The operation of the above mentioned system is described hereinafter in detail. The system is not effected before the open-type and closed-type switches 54 and 55 are operated. The voltage of the main memory condenser 9 is constantly discharged to the negative pole of the vehicle battery 56 by way of the closed-type switch 55. Closing the open-type switch 54 opens simultaneously the closed-type switch 55. Immediately, current is supplied to the relay coil 45 for 0.1 second by way of the intermittent pulse generator 11 to connect the contact 12 to the X side. At this moment, the contact 17 is closed for 0.1 second.

In the vehicle speed read-out circuit 10, as well known, gain of the first source follower circuit of the junction-gate field-effect transistor 13 is substantially identified to be 1 which is in proportion with the input voltage of the gate. The voltage of the main memory condenser 9 is represented to be null volt and the potential at the gate of the junction-gate field-effect transistor 13 is also null volt. Thus, the field-effect transistor 13 is biased into no conduction and the source potential of the transistor 13 becomes almost null volt. Charged at the both terminals of the subsidiary memory condenser 16 is a voltage represented by a difference between the source potential of the field-effect transistor 13 and the vehicle battery voltage divided by the resistors 20 and 21, for instance 2 volts, the charged potential being substantially identified to be $0 - 2V =$ −2V. The charging continues for 0.1 second during closure of the relay contact 17.

When the above-mentioned operation is completed, the contact 12 engages with the Y side thereby to open the contact 17 by way of the function of the intermittent pulse generating circuit 11. In this condition, a voltage proportional to a vehicle speed appears in the voltage generating circuit 1. This voltage is coupled to the gate of the field-effect transistor 13 and produced at the source of the transistor 13 is a proportional potential.

When the voltage appearing in the voltage generating circuit 1 is predetermined to be 5 volts at a rate of speed of 100 km/h, the source potential of the transistor 13 is almost 5 volts. Thus, the potential at the junction of the subsidiary memory condenser 16 and the gate of the junction-gate field-effect transistor 18 may be represented by "5 − (−2) = 7," 7 volts which is a difference between the voltage proportional to the instantaneous speed, for instance, 5 volt at 100 km/h and (−) 2 volts charged into the condenser 16 previously described. And the field-effect transistor 18 is biased into conduction, thereby reducing the output of the differntial amplifier 23 to turn the valve control circuit 24 to a non-conductive state. Thus, the servomotor 136 shown in FIG. 3 is kept inoperative. This explains that the system cannot be activated only by closing the open-type switch 54.

When the rate of a traveling speed of the vehicle reaches a desired one, the vehicle operator pushes the set switch 7 which is interlocked with the switch 8. The both switches 7 and 8 are closed and the switch 8 energizes the relay coil 45, thereby engaging the contacts 12 and 17 with the X side respectively. Simultaneously, a voltage proportional to the selected vehicle speed is charged in the main memory condenser 9. The potential is biased on the gate of the field-effect transistor 13, thereby producing a potential approximately in proportion to the gate potential in the first source follower circuit. In this instance, charged in the subsidiary memory condenser 16 is a potential in a value represented by a difference between the source potential of the field-effect transistor 13 and the vehicle battery potential divided by the resistors 20 and 21, for instance, 2 volts. In the case that the selected vehicle speed of 60 km/h is substantially identified by 3 volts, "3 − 2 = 1," 1 volt is charged in the subsidiary memory condenser 16.

Opening of the switches 7 and 8 engages the contact 12 onto the Y side, thereby opening the contact 17. Consequentially, the voltage proportional to the vehicle speed is applied to the gate of the field-effect transistor 13 and a voltage appears across the source of the transistor 13 proportionally to the one at the gate thereof. Applied to the gate of the field-effect transistor 18 is a voltage which is equivalent with a difference between the voltage proportional to actual speed rate, for instance, 3 volts at 60 km/h and the one memorized among the terminals of the subsidiary memory condenser 16, the latter being represented by 1 volt. And the same voltage, 2 volts appear across the source of the transistor 18 in the second source follower circuit.

This can well be identified by a formula, $$V - (V - P) = P$$

*V* represents a voltage proportional to vehicle speed at setting the switch 7,8.

*P* represents battery voltage divided by the resistors 20 and 21 and a gate potential of the FET 18 when the instantaneous speed is same as the selected and memorized one.

When the instantaneous speed is same as the selected and memorized one, the output voltage of the comparison circuit 15 is stabilized at *P* volt. When an instantaneous speed differs from the selected and memorized one by $\Delta V$, the output voltage of the comparison circuit 15 changes to be "$V + \Delta V - (V - P) = \Delta V + P$," thereby increasing output voltage by $\Delta V$. This increase in the output voltage of the comparison circuit 15 reduces the output voltage of the valve control circuit 24, which, in turn, controls the servomotor 136 to close the throttle valve 36. On the other hand when an instantaneous speed differs from the selected and memorized one by $-\Delta V$, the above formula becomes "$V - \Delta V - (V - P) = -\Delta V + P$," which indicates a $\Delta V$ decrease of the output voltage of the comparison circuit 15. Thus, the output voltages of the differential amplifier 23 and, in turn, the valve control circuit 24 are biased in greater conduction so as to operate the servomotor 136. And the throttle valve 36 is opened.

Under the mentioned operation, when the brake is actuated, the switch 43 of the release circuit 38 is closed to turn the silicon controlled rectifier 39 in conduction. This applies the voltage from the battery 56 onto the base of the transistor 26 of the differential amplifier 23 through the switches 54 and 44, the silicon controlled rectifier 39 and the resistor 41. Consequentially, the system is disabled.

Figure 2:
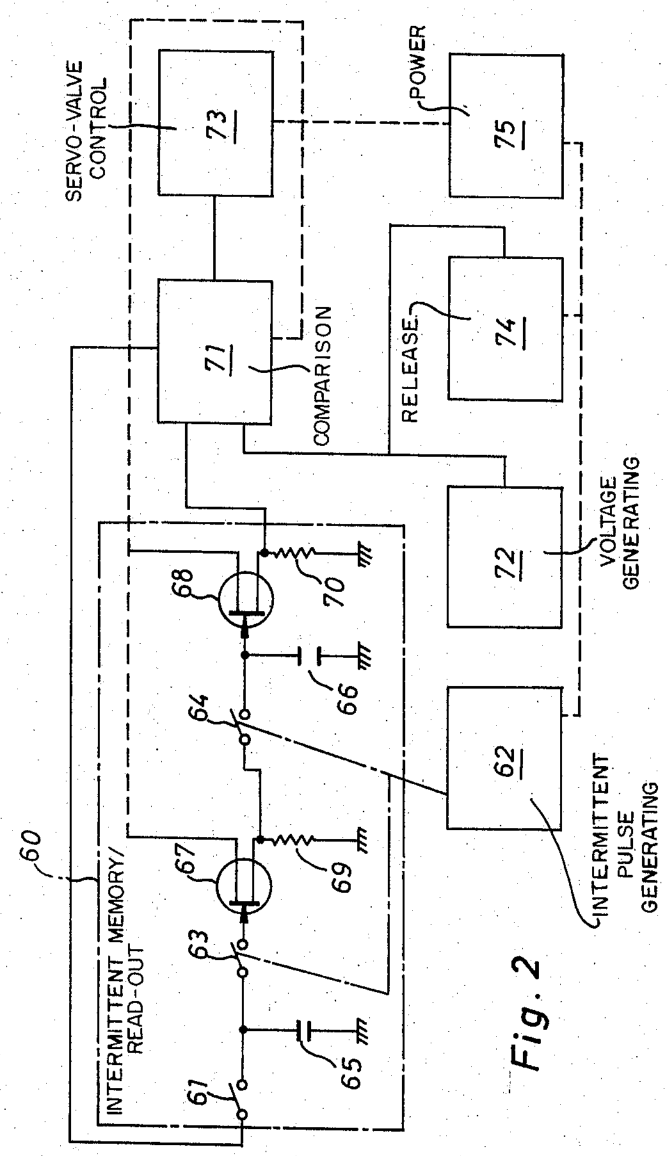
FIG. 2 depicts diagramatically a circuit for an electronic speed control system for a vehicle, the circuit including another embodiment of a voltage memory circuit in accordance with the present invention.

FIG. 2 shows a second preferred embodiment of a speed control system in accordance with the present invention. The disclosed system includes an intermittent memory/read-out circuit 60 comprising a set switch 61, relay contacts 63 and 64 driven by an intermittent pulse generating circuit 62, a main memory condenser 65, a subsidiary memory condenser 66, junction-gate field-effect transistors 67 and 68 and source resistors 69 and 70 for the transistors 67 and 68. The intermittent pulse generating circuit 62 is formed by an astable multivibrator as in the previously preferred embodiment. A comparison circuit 71 whose first input terminal is connected to the output of the circuit 60 and whose second input terminal is in connection with the output of a voltage generating circuit 72 for issuing a voltage proportional to a vehicle speed. Reference numeral 73 indicates a servovalve control circuit for regulating a vacuum servomotor by way of an output from the comparison circuit 71. A release circuit 74 is provided to disable the function of the system when the vehicle operator actuates the brake. An electric source circuit 75 is to supply voltage along the broken line in the figure.

Closing the set switch 61 latches the contacts 63 and 64, which are driven by the intermittent pulse generating circuit 62, into closed condition. Connection is completed between the source follower circuits of the field-effect transistors 67 and 68. Thus, as gain of the circuit 60 is substantially identified to be 1, this circuit 60 has an approximately same output voltage as that from the comparison circuit 71. Simultaneously, a voltage from the voltage generating circuit 72 is applied to the comparison circuit 71 and checked against the output voltage from the intermittent memory/read-out circuit 60. So as to balance up the voltages from the voltage generating circuit 72 and the intermittent memory/read-out circuit 60, the comparison circuit 71 feeds back a reference voltage to the intermittent memory/-read-out circuit 60. Then, a selected vehicle speed is memorized in the main and subsidiary condensers 65 and 66.

When the set switch 61 is opened under the mentioned state, the relay contacts 63 and 64 is operated only by the intermittent pulse generating circuit 62 to close for 0.1 second every 10 seconds. Thus, the reference voltage in the main memory condenser 65 or the voltage proportional to the selected and memorized vehicle speed is read out every 10 seconds by the field-effect transistor 67 and charged in the subsidiary memory condenser 66. Simultaneously, applied to the comparison circuit 71 are the reference voltage proportional to the selected and memorized vehicle speed by way of the source follower circuit of the field-effect transistor 68 and a voltage from the voltage generating circuit 72. When the mentioned voltages differ from each other, the comparison circuit 71 issues a voltage which actuates the servomotor to compensate the vehicle speed. Consequentially, the vehicle can travel at a constant selected speed. The application of the present invention is not limited for a vehicle speed control system, but available for controlling rotation of an electric fan and luminousness of an electric bulb.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

What is claimed is:

1. A voltage memory circuit for an electronic control system comprising:

a voltage generating circuit for generating a voltage representing a condition of means to be controlled by said control system;

a first memory condenser connected to said voltage generating circuit through a set switch for memorizing an instantaneous voltage generated from said voltage generating circuit upon closure of said set switch;

a source follower circuit including a field-effect transistor and a source resistor and for selectively reading the memorized voltage in said first memory condenser and the voltage from said voltage generating circuit;

an intermittent signal generating circuit for producing an intermittent output signal;

switching means associating with said intermittent output signal thereby to complete intermittent connections of said source follower circuit with said voltage generating circuit and said first memory condenser;

a second memory condenser for intermittently memorizing a difference between a given voltage and the voltage from said first memory condenser through said source follower circuit under the action of said switching means responsive to said intermittent output signal; and whereby the voltage representing the variation of the condition of said means to be controlled by said control system is delivered across said second memory condenser.

2. A voltage memory circuit for an electronic control system as claimed in claim 1, wherein said field-effect transistor of said source follower circuit is a junction-gate field-effect transistor.

3. A voltage memory circuit for an electronic control system as claimed in claim 1, wherein said switching means comprises a relay switch driven by said intermittent pulse generating circuit and interlocked with a second relay switch for intermittently connecting said second memory condenser to an electric source.

4. A voltage memory circuit for an electronic control system as claimed in claim 3, wherein said intermittent pulse generating circuit is an astable multivibrator connected with an electric source.

5. A voltage memory circuit for an electronic control sysstem as claimed in claim 4, wherein said astable multivibrator includes a relay switch interlocked with said set switch for connecting said voltage generating circuit with said first memory condenser.

6. A voltage memory circuit for an electronic control system as claimed in claim 1, wherein said second memory condenser is connected at its output to a second source follower circuit including a junction-gate field-effect transistor and a source resistor.

7. A voltage memory circuit for an electronic control system comprising:

a voltage generating circuit for generating a voltage representing a condition of means to be controlled by said control system;

a comparison circuit including a first and a second input terminal, said first terminal being connected with said voltage generating circuit;

a memory condenser connected to said voltage generating circuit through said comparison circuit and a set switch and for memorizing an instantaneous voltage from said voltage generating circuit upon closure of said switch;

a source follower circuit including a field-effect transistor and a source resistor for intermittently reading the memorized voltage in said memory condenser and applying the memorized voltage therefrom to said second input terminal of said comparison circuit;

an intermittent signal generating circuit for producing an intermittent output signal; and switching means associating with said intermittent output signal to complete intermittent connections of said memory condenser with the gate of said source follower circuit.

8. A voltage memory circuit for an electronic control system as claimed in claim 7, wherein a second memory condenser is interposed between said second input terminal of said comparison circuit and the output of said first source follower circuit through a relay switch interlocked with said switching means.

9. A voltage memory circuit for an electronic control system as claimed in claim 8, wherein a second source follower circuit is provided in connection with said second memory condenser and said second input terminal of said comparison circuit.

10. A voltage memory circuit for an electronic control system as claimed in claim 7, wherein said switching means is a relay switch driven by an intermittent pulse generating circuit.

11. A voltage memory circuit for an electronic control system as claimed in claim 10, wherein said intermittent pulse generating circuit is an astable multivibrator.

* * * * *